(12) United States Patent
Weber, Jr. et al.

(10) Patent No.: US 12,452,689 B2
(45) Date of Patent: Oct. 21, 2025

(54) NETWORK INTERFACE VERIFICATION AND METHOD AND SYSTEM FOR REMEDIATING FAILURES IDENTIFIED THROUGH PING OPERATIONS

(71) Applicant: DISH WIRELESS L.L.C., Englewood, CO (US)

(72) Inventors: Kenneth William Weber, Jr., Littleton, CO (US); Mohammad Dawood Shahdad, Aurora, CO (US); Arjun Sarath, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 365 days.

(21) Appl. No.: 18/138,623

(22) Filed: Apr. 24, 2023

(65) Prior Publication Data

US 2024/0357373 A1    Oct. 24, 2024

(51) Int. Cl.
| | |
|---|---|
| H04W 16/18 | (2009.01) |
| G06F 16/29 | (2019.01) |
| H04L 43/10 | (2022.01) |
| H04W 24/04 | (2009.01) |
| H04W 48/08 | (2009.01) |
| H04W 48/16 | (2009.01) |

(52) U.S. Cl.
CPC ............ *H04W 16/18* (2013.01); *G06F 16/29* (2019.01); *H04L 43/10* (2013.01); *H04W 24/04* (2013.01); *H04W 48/08* (2013.01); *H04W 48/16* (2013.01)

(58) Field of Classification Search
None
See application file for complete search history.

(56) References Cited

U.S. PATENT DOCUMENTS

| | | | | |
|---|---|---|---|---|
| 6,058,420 A * | 5/2000 | Davies | ................ | H04L 41/0686 709/224 |
| 6,747,957 B1 * | 6/2004 | Pithawala | ............. | H04L 43/067 709/224 |
| 7,983,173 B2 * | 7/2011 | Finn | ........................ | H04L 43/50 370/242 |
| 11,063,857 B2 * | 7/2021 | Tewari | ................ | H04L 43/0811 |
| 2003/0231741 A1 * | 12/2003 | Rancu | ................... | H04M 3/303 379/1.01 |

(Continued)

FOREIGN PATENT DOCUMENTS

| | | | | |
|---|---|---|---|---|
| GB | 2 286 508 A * | 8/1995 | .......... | G06F 11/0715 |
| WO | WO 2023/146898 A1 * | 8/2023 | ............. | H04L 41/22 |

*Primary Examiner* — Rafael Perez-Gutierrez
(74) *Attorney, Agent, or Firm* — Kipman T. Werking; Frontier IP Law PLLC

(57) ABSTRACT

A disclosed method may include (i) maintaining a database that maps cellular reference link types to geographic hubs that include a respective cellular network node connected through a respective cellular reference link type, (ii) cycling through the database, within a portion of the database for a specific cellular reference link type, to perform a ping operation from each respective geographic hub mapped to the specific cellular reference link type, and (iii) displaying, through a graphical user interface, results to an administrator indicating which ping operations from the cycling through the database indicated a failure such that the administrator is enabled to perform a remediation operation. Various other systems and computer-readable mediums are further disclosed.

20 Claims, 10 Drawing Sheets

(56) References Cited

U.S. PATENT DOCUMENTS

| | | | | |
|---|---|---|---|---|
| 2004/0132409 A1* | 7/2004 | Arnold | ................ | H04L 12/4633 |
| | | | | 455/67.11 |
| 2015/0023151 A1* | 1/2015 | Liu | ........................ | H04L 43/50 |
| | | | | 370/218 |
| 2020/0322283 A1* | 10/2020 | Osterlund | ........... | H04L 65/1104 |
| 2022/0006701 A1* | 1/2022 | Patel | ....................... | H04L 41/40 |
| 2023/0254227 A1* | 8/2023 | Mori | ....................... | H04L 43/10 |
| | | | | 709/224 |
| 2024/0340230 A1* | 10/2024 | Weber, Jr. | ................ | H04L 61/45 |
| 2024/0397412 A1* | 11/2024 | Kaki | .................... | H04W 48/14 |

* cited by examiner

| Ping Detail: 602 | 604 | 606 | 608 | 610 |
|---|---|---|---|---|
| | | N4 Interface (From all UPFd's Towards SMF) 648 | | |
| UPFd Location 650 | Test Type | Source IP | Target IP | Result |
| Denver 612 | Ping | 9.255.62.5 | 9.255.52.132 | Pass |
| Las Vegas 614 | Ping | 9.255.61.5 | 9.255.52.132 | Pass |
| Portland 616 | Ping | 9.255.69.5 | 9.255.53.132 | Pass |
| Phoenix 618 | Ping | 9.255.63.5 | 9.255.53.132 | Pass |
| Seattle 620 | Ping | 9.255.68.125 | 9.255.53.132 | Pass |
| San Jose 622 | Ping | 9.255.69.125 | 9.255.53.132 | Pass |
| Chicago 624 | Ping | 9.255.65.5 | 9.255.55.132 | Pass |
| Columbus 626 | Ping | 9.255.12.5 | 9.255.55.132 | Pass |
| Minneapolis 628 | Ping | 9.255.67.5 | 9.255.55.132 | Pass |
| Houston 630 | Ping | 9.255.65.5 | 9.255.55.132 | Pass |
| Kansas City 632 | Ping | 9.255.64.5 | 9.255.56.132 | Pass |
| Dallas 634 | Ping | 9.255.74.5 | 9.255.56.132 | Pass |
| Atlanta 636 | Ping | 9.255.66.5 | 9.255.58.132 | Pass |
| Boston 638 | Ping | 9.255.64.125 | 9.255.58.132 | Pass |
| Philadelphia 640 | Ping | 9.255.68.5 | 9.255.58.132 | Pass |
| New York 642 | Ping | 9.255.67.125 | 9.255.59.132 | Pass |
| Miami 644 | Ping | 9.255.70.5 | 9.255.59.132 | Pass |
| Washington DC 646 | Ping | 9.255.12.5 | 9.255.59.132 | Pass |

Summary Data: S8-U Interface (From all UPFd's Towards Roaming Partner SGW)

| UPFd Location | Test Type | PassCount | FailCount | TotalCount | PassRate |
|---|---|---|---|---|---|
| Denver | GtpPing | 4 | 0 | 4 | 100% |
| Las Vegas | GtpPing | 4 | 0 | 4 | 100% |
| Portland | GtpPing | 4 | 0 | 4 | 100% |
| Phoenix | GtpPing | 4 | 0 | 4 | 100% |
| Seattle | GtpPing | 4 | 0 | 4 | 100% |
| San Jose | GtpPing | 4 | 0 | 4 | 100% |
| Chicago | GtpPing | 4 | 0 | 4 | 100% |
| Columbus | GtpPing | 4 | 0 | 4 | 100% |
| Minneapolis | GtpPing | 4 | 0 | 4 | 100% |
| Houston | GtpPing | 4 | 0 | 4 | 100% |
| Kansas City | GtpPing | 4 | 0 | 4 | 100% |
| Dallas | GtpPing | 4 | 0 | 4 | 100% |
| Atlanta | GtpPing | 4 | 0 | 4 | 100% |
| Boston | GtpPing | 4 | 0 | 4 | 100% |
| Philadelphia | GtpPing | 4 | 0 | 4 | 100% |
| New York | GtpPing | 4 | 0 | 4 | 100% |
| Miami | GtpPing | 4 | 0 | 4 | 100% |
| Washington DC | GtpPing | 4 | 0 | 4 | 100% |

Summary Data: N6 Left/Right Service Chain

| UPFd Location | Test Type | PassCount | FailCount | TotalCount | PassRate |
|---|---|---|---|---|---|
| Denver | Ping | 8 | 0 | 8 | 100% |
| Las Vegas | Ping | 8 | 0 | 8 | 100% |
| Portland | Ping | 8 | 0 | 8 | 100% |
| Phoenix | Ping | 8 | 0 | 8 | 100% |
| Seattle | Ping | 8 | 0 | 8 | 100% |
| San Jose | Ping | 8 | 0 | 8 | 100% |
| Chicago | Ping | 8 | 0 | 8 | 100% |
| Columbus | Ping | 8 | 0 | 8 | 100% |
| Minneapolis | Ping | 8 | 0 | 8 | 100% |
| Houston | Ping | 8 | 0 | 8 | 100% |
| Kansas City | Ping | 8 | 0 | 8 | 100% |
| Dallas | Ping | 8 | 0 | 8 | 100% |
| Atlanta | Ping | 8 | 0 | 8 | 100% |
| Boston | Ping | 8 | 0 | 8 | 100% |
| Philadelphia | Ping | 8 | 0 | 8 | 100% |
| New York | Ping | 8 | 0 | 8 | 100% |
| Miami | Ping | 8 | 0 | 8 | 100% |
| Washington DC | Ping | 8 | 0 | 8 | 100% |

HC TestcaseStats:99.432% 4180627127 1234

*FIG. 9*

NETWORK INTERFACE VERIFICATION AND METHOD AND SYSTEM FOR REMEDIATING FAILURES IDENTIFIED THROUGH PING OPERATIONS

BRIEF SUMMARY

The present disclosure is generally directed to network interface verification. In one example, a method may include (i) maintaining a database that maps cellular reference link types to geographic hubs that include a respective cellular network node connected through a respective cellular reference link type, (ii) cycling through the database, within a portion of the database for a specific cellular reference link type, to perform a ping operation from each respective geographic hub mapped to the specific cellular reference link type, and (iii) displaying, through a graphical user interface, results to an administrator indicating which ping operations from the cycling through the database indicated failure such that the administrator is enabled to perform a remediation operation.

In some examples, the method further includes repeating the cycling through the database, within the portion of the database for the specific cellular reference link type, for each type of cellular reference link type in a set of multiple distinct cellular reference link types.

In some examples, the method further includes repeating the cycling through the database, within the portion of the database for the specific cellular reference link type, for each type of cellular reference link type in a set of substantially every distinct cellular reference link type for 5G cellular networks.

In some examples, the set of multiple distinct cellular reference link types comprises at least three of N1-N15.

In some examples, each respective cellular network node includes a different one from a set of a user equipment, a radio access network, a user plane function, a data network, an access and mobility management function, a session management function, a policy control function, an application function, a unified data management node, or an authentication server function.

In some examples, the cellular reference link types correspond to a 5G cellular network.

In some examples, displaying, through the graphical user interface, results to the administrator indicating which ping operations from the cycling through the database indicated failure such that the administrator is enabled to perform the remediation operation comprises dynamically displaying a source Internet Protocol address or a target Internet Protocol address for each ping operation that indicated failure.

In some examples, displaying, through the graphical user interface, results to the administrator indicating which ping operations from the cycling through the database indicated failure such that the administrator is enabled to perform the remediation operation comprises dynamically omitting a source Internet Protocol address or a target Internet Protocol address for each ping operation that indicated success.

In some examples, displaying, through the graphical user interface, results to the administrator indicating which ping operations from the cycling through the database indicated failure such that the administrator is enabled to perform the remediation operation comprises displaying, for each geographic hub among the geographic hubs, a pass count of ping operations, a fail count of ping operations, a total count of ping operations, or a pass rate of ping operations.

In some examples, cycling through the database, within the portion of the database for the specific cellular reference link type, to perform a ping operation from each respective geographic mapped to the specific cellular reference link type, comprises performing multiple ping operations from each respective cellular network node.

In some examples, a corresponding system may include at least one physical processor and a non-transitory computer-readable medium encoding instructions that, when executed by the at least one physical processor, cause operations to be performed comprising (i) maintaining a database that maps cellular reference link types to geographic hubs that include a respective cellular network node connected through a respective cellular reference link type, (ii) cycling through the database, within a portion of the database for a specific cellular reference link type, to perform a ping operation from each respective geographic hub mapped to the specific cellular reference link type, and (iii) displaying, through a graphical user interface, results to an administrator indicating which ping operations from the cycling through the database indicated a failure such that the administrator is enabled to perform a remediation operation.

In some examples, a non-transitory computer-readable medium may include instructions that, when executed by at least one physical processor of a computing device, cause the computing device to perform operations comprising (i) maintaining a database that maps cellular reference link types to geographic hubs that include a respective cellular network node connected through a respective cellular reference link type, (ii) cycling through the database, within a portion of the database for a specific cellular reference link type, to perform a ping operation from each respective geographic hub mapped to the specific cellular reference link type and (iii) displaying, through a graphical user interface, results to an administrator indicating which ping operations from the cycling through the database indicated a failure such that the administrator is enabled to perform a remediation operation.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 6 shows a graphical user interface for the N4 reference link type that lists user plane function nodes and corresponding geographic hubs.

FIG. 7 shows a graphical user interface for the S8-U reference link type that lists user plane function nodes and corresponding geographic hubs.

FIG. 9 shows another graphical user interface for the N6 reference link type that lists user plane function nodes and corresponding geographic hubs.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the present disclosure. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
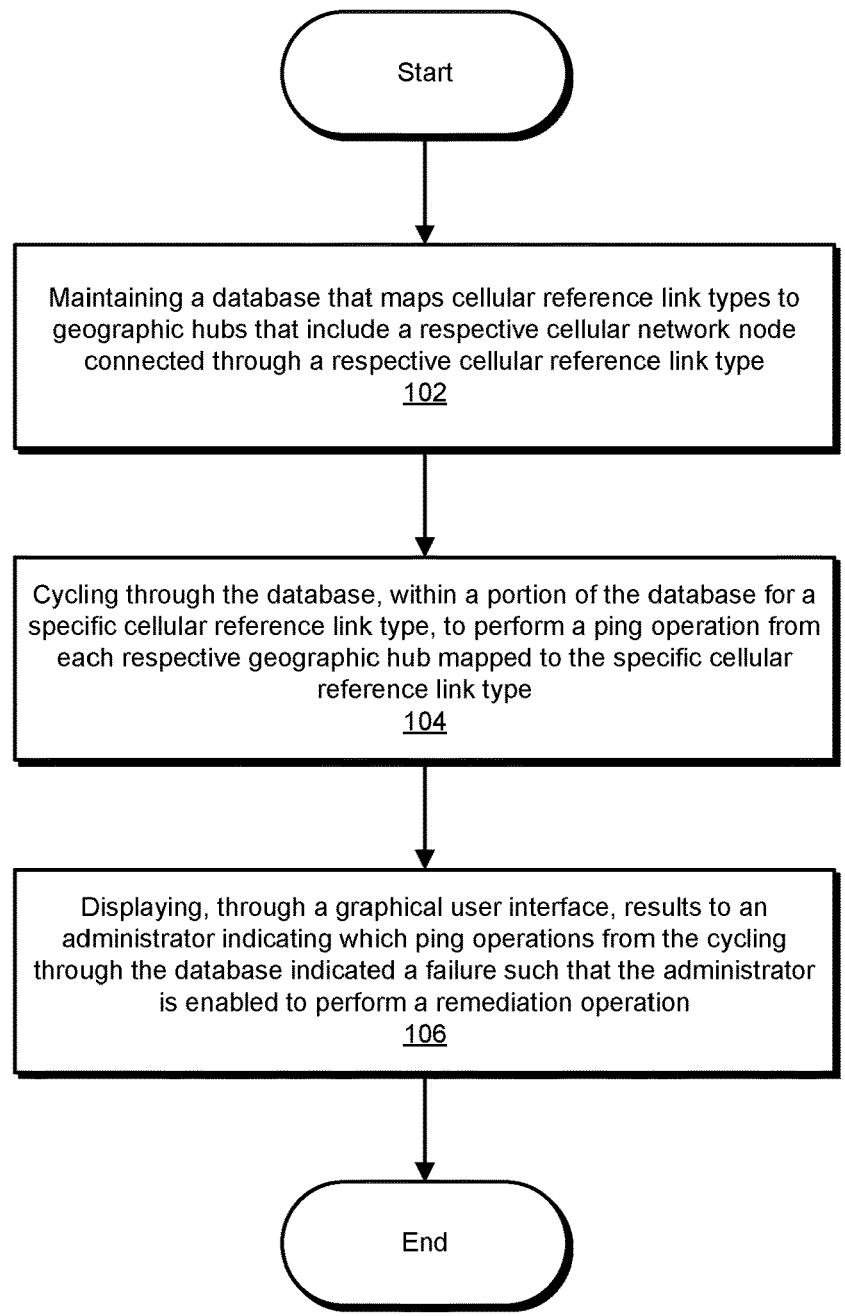
FIG. 1 shows a flow diagram for performing network interface verification.

FIG. 1 shows a flow diagram for an example method 100 for performing network interface verification. At step 102, one or more of the systems described herein may maintain a database that maps cellular reference link types to geographic hubs that include a respective cellular network node connected through a respective cellular reference link type. Subsequently, at step 104, one or more of the systems described herein may cycle through the database, within a portion of the database for a specific cellular reference link type, to perform a ping operation from each respective geographic hub mapped to the specific cellular reference link type. Lastly, at step 106, one or more of the systems described herein may display, through a graphical user interface, results to an administrator indicating which ping operations from the cycling through the database indicated failure such that the administrator is enabled to perform a remediation operation. Additional details regarding the performance of method 100 and/or additional descriptions of various embodiments or optional implementation details regarding method 100 will be provided below in connection with FIGS. 2-9.

Figure 2:
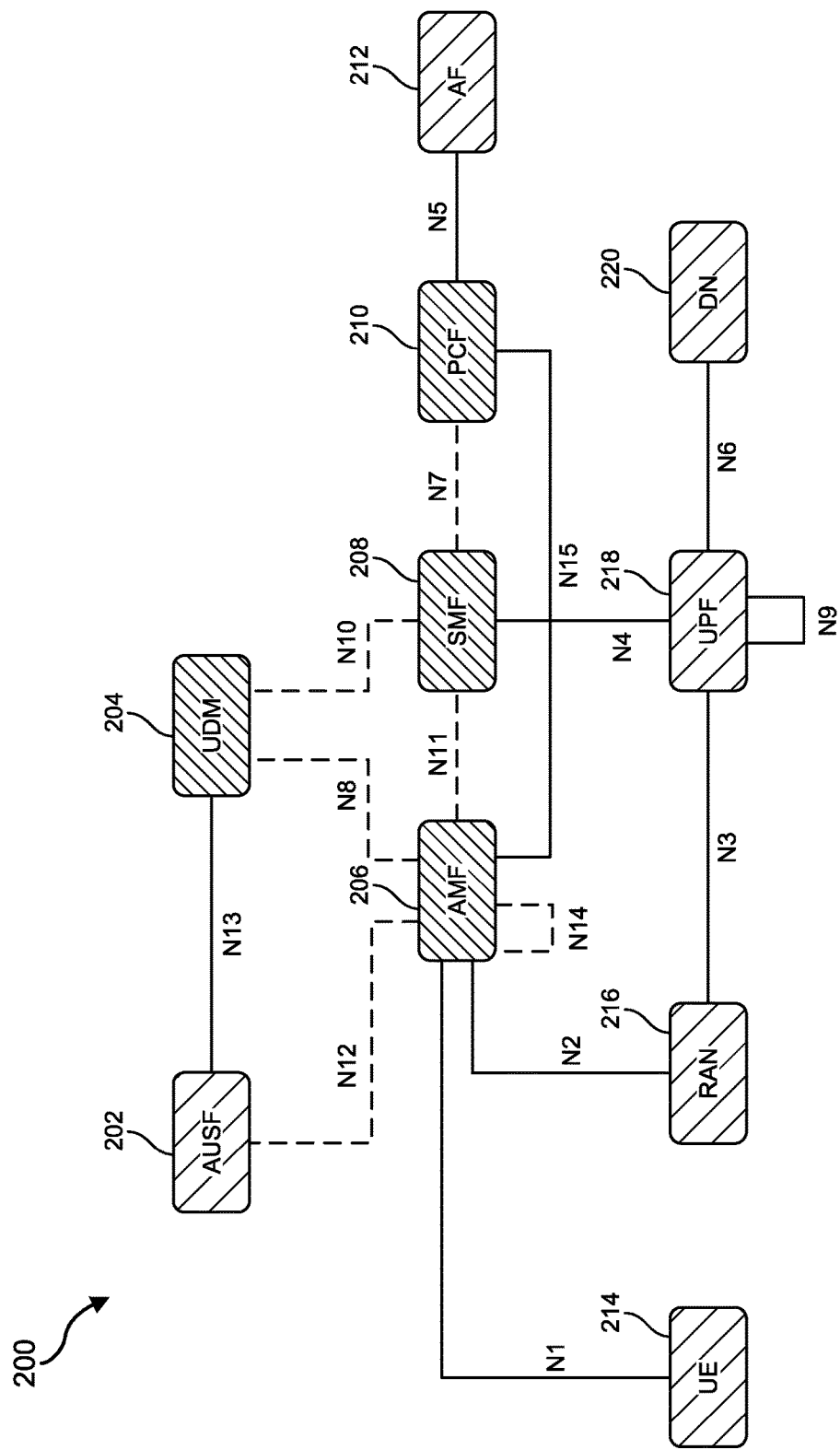
FIG. 2 shows a diagram of a partial view of a 5G cellular network, its corresponding functional nodes, and cellular reference links that connect the functional nodes.

FIG. 2 shows an illustrative diagram 200 for a point-to-point architecture for a cellular network core. As further shown in this figure, diagram 200 may include various nodes interconnected by corresponding cellular reference links. In particular, diagram 200 further includes a user equipment 214, a radio access network 216, a user plane function 218, a data network 220, an access and mobility management function 206, a session management function 208, a policy control function 210, an application function 212, a unified data management node 204, and/or an authentication server function 202.

As used herein, the term "cellular reference links" generally refers to inter-node links, connections, or interfaces between cellular network nodes, and should be interpreted consistent with FIG. 2 and consistent with the usage by those having skill in the cellular network arts. The term "cellular reference links" can generally be interchangeable with "reference points" or "reference interfaces," as those terms are used by those having skill in the art. Moreover, the present disclosure can generally refer to the term "cellular reference links" as interconnecting various nodes of the cellular network (see FIG. 2), despite the fact that, in some sense, the cellular reference links also constitute nodes themselves (i.e., at a more granular level of abstraction or network modeling). The present disclosure can use the term "cellular reference links" in the context of both point-to-point reference architectures (see FIG. 2) and service-based architectures, which can both use N1, N2, N3, N4, and N6 interfaces, for example. In particular, diagram 200 shows cellular reference links N1-N8, N10, and N12-15, for example.

Figure 3:
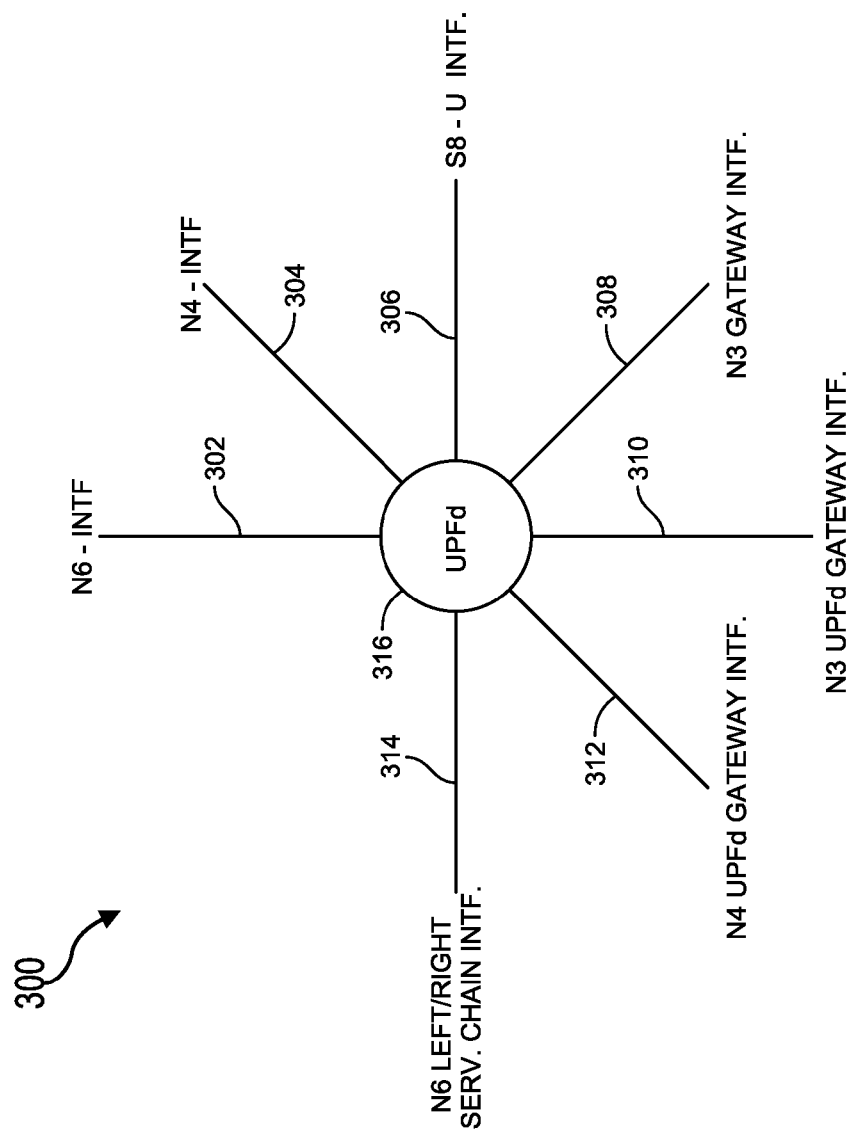
FIG. 3 shows a diagram of a user plane function node and its connecting cellular reference links.
Figure 4:
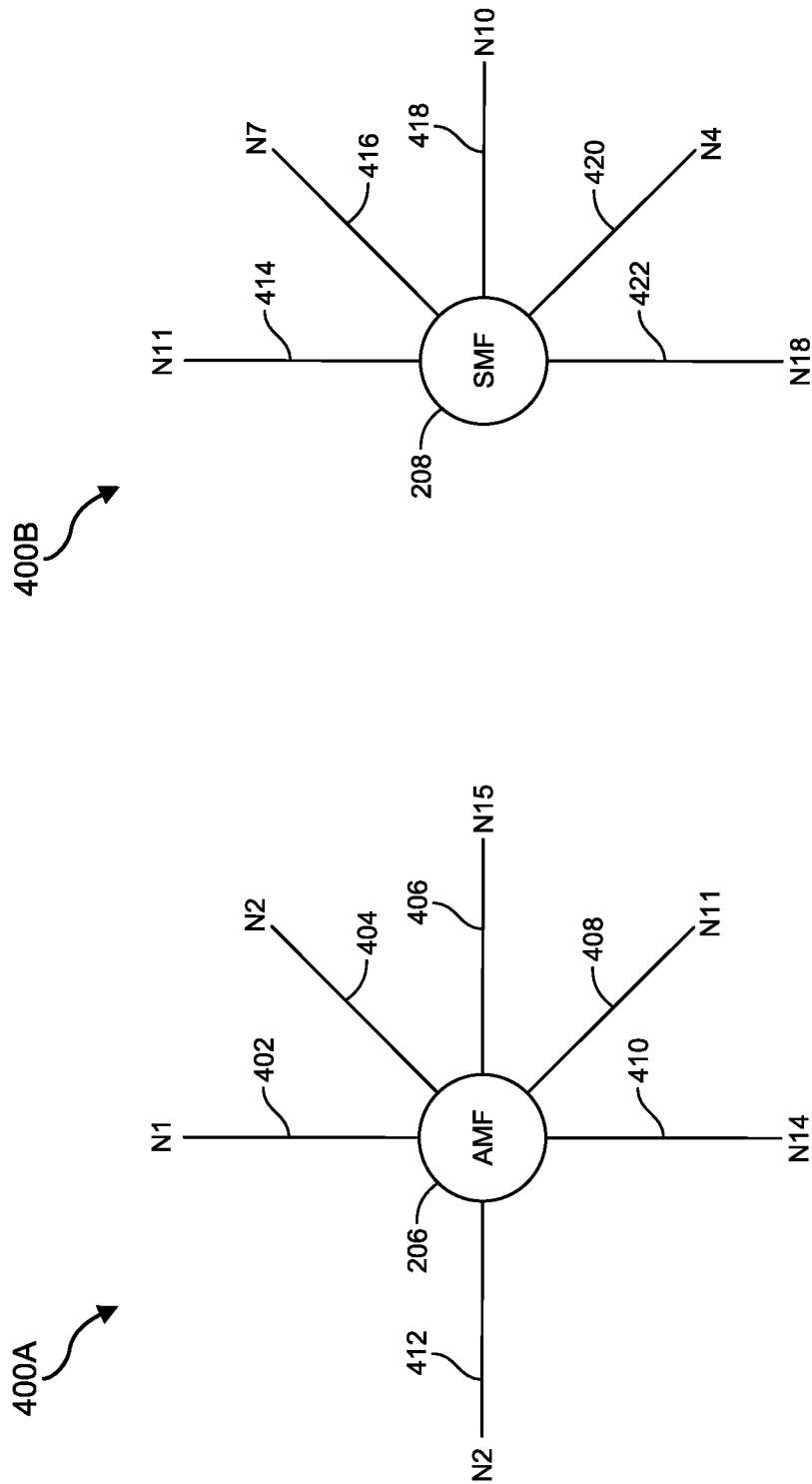
FIG. 4 shows a diagram of an access and mobility function node and a session management function node, as well as their connecting cellular reference links.

FIGS. 3-4 show illustrative diagrams 300, 400A, and 400B that help to show how cellular network nodes, such as user plane function nodes specific to data (e.g., Internet) network traffic (see diagram 300), access and mobility function nodes (see diagram 400A), and/or session management function nodes (see diagram 400B) connect through cellular reference links to other functional nodes of a corresponding 5G cellular network. Accordingly, the diagrams of FIGS. 3-4 elaborate on illustrative portions of diagram 200 to help highlight and illustrate these interconnections. Diagram 300 shows how a user plane function node 316 can be connected by cellular reference links 302-314 to various other functional nodes of a corresponding 5G cellular network. Diagram 400A shows how an access and mobility function node may similarly be connected by cellular reference links 402-412 to various other functional nodes of a corresponding 5G cellular network. Lastly, diagram 400B shows how a session management function node 208 may be connected by cellular reference links 414-422 to various other functional nodes of a corresponding 5G cellular network, consistent with diagram 200, as further discussed in detail above.

Figure 5:
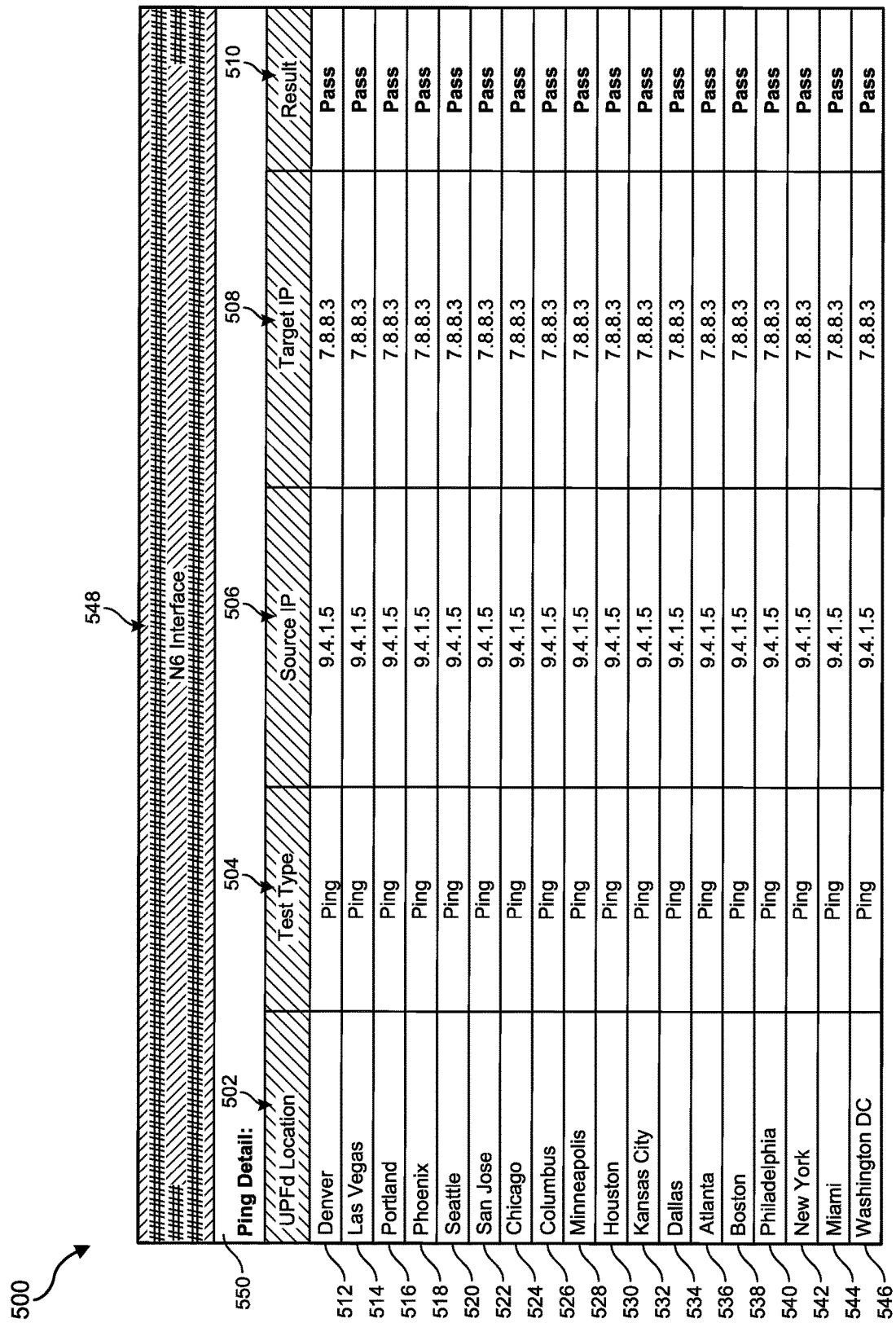
FIG. 5 shows a graphical user interface for the N6 reference link type that lists user plane function nodes and corresponding geographic hubs.

FIG. 5 shows an illustrative graphical user interface 500 that further includes a headline 548, a header section 550, columns 502-510, and rows 512-546. As further shown in this figure, diagram 500 may illustrate the results of performing one or more test operations, each test operation having a particular type (e.g., "Ping" in FIG. 5), with respect to a list or series of geographic hubs, including the illustrative example of geographic hubs listed within rows 512-546. The results showed within graphical user interface 500 may constitute an excerpt, portion, all, or substantially all of a database, as discussed above in connection with method 100 of FIG. 1. In particular, graphical user interface 500 may correspond to a portion of the database managing, or assigned to, a particular cellular reference link, the "N6 interface" of a 5G cellular network, as is indicated by headline 548. Consistent with diagram 200, this particular cellular reference link may form an interconnection between a user plane function or UPF node of a corresponding cellular network, and in particular a "UPFd" node where the "d" designates a data (e.g., Internet) connection. Furthermore, as illustrated with diagram 200, the N6 interface connects to a corresponding data network, and in particular to a larger wide area network such as the Internet. Accordingly, column 506 of graphical user interface 500 specifies the network address (e.g., source Internet protocol address) of the UPFd from which the corresponding pinging operations is originating, and column 508 specifies the network address (e.g., target Internet protocol address) of a network node, bridge, or router providing access to the corresponding data network, such as data network 220 in diagram 200. In the example of graphical user interface 500, a single ping operation has been performed from the source Internet protocol address to the target Internet protocol address for each one of the geographic hubs corresponding to rows 512-546. The top of the test operation (i.e., "Ping") is further indicated at column 504 of graphical user interface 500. Moreover, a result of each respective ping operation is indicated at column 510 of graphical user interface 500. Nevertheless, in other examples, multiple different pinging operations may be performed from the same source Internet protocol address to the same corresponding target Internet protocol address, and a ratio of successful pings may be reported for each respective geographic hub (see, e.g., FIG. 9). Similarly, in the example of graphical user interface 500, the same source Internet protocol address for the user plane function node has been used for each geographic hub corresponding to rows 512-546. Nevertheless, in other examples, various different ones of the geographic hubs may issue pinging operations from different source Internet protocol addresses, as in the example of the N4 interface (see FIG. 6), which is discussed in more detail below.

FIG. 6 shows a graphical user interface 600 that substantially parallels graphical user interface 500, except that graphical user interface 600 corresponds to the N4 interface (see diagram 200), whereas graphical user interface 500 corresponds to the N6 interface, as further discussed above. As further shown in this figure, graphical user interface 600 may further include a headline 648, a header section 650, columns 602-610, and rows 612-646. Accordingly, graphical user interface 600 reports the results of performing pinging operations from respective user plane function nodes at source Internet protocol addresses, as indicated by column 606, to respective session management nodes at target Internet protocol addresses, as indicated by column 608. Moreover, graphical user interface 600 further illustrates how, although the user plane function for the N6 interface in graphical user interface 500 used the same source Internet protocol address for each respective geographic hub, the N4 interface in graphical user interface 600 may be tested from multiple distinct user plane function nodes toward respective session management function nodes, as indicated by the varying source Internet protocol addresses indicated that column 606.

Similarly, FIG. 7 shows an illustrative graphical user interface 700 that substantially parallels graphical user interfaces 500 and 600, except that graphical user interface 700 corresponds to the S8-U interface, which may provide an interface between user plane function nodes (e.g., UPDs) of a primary cellular service provider and roaming serving gateways provided by a roaming cellular partner that partners with the primary cellular service provider according to a partnership agreement for the provisioning of cellular services, as understood by those having skill in the art. Graphical user interface 700 further includes a headline 750, a header section 752, columns 702-712, and rows 714-748. Moreover, graphical user interface 700 also further differs from graphical user interfaces 500 and 600 in that graphical user interface 700 further shows the results of multiple pinging operations performed at each respective geographic hub, rather than the result of a single respective pinging operation performed at each respective geographic hub (as in the case of FIGS. 5-6). In particular, graphical user interface 700 further illustrates how, for each respective geographic hub corresponding to a respective row within rows 714-748, four separate pinging operations have been performed, as indicated by the total count values listed within column 710. In the particular example of this figure for illustrative purposes, each instance of these series of respective four pinging operations indicated success rather than failure, resulting in a value of four listed at each respective row of column 706, and a value of zero at each respective row of column 708, as well as a value of 100% at column 712. Nevertheless, those having skill in the art can readily ascertain that, in other illustrative examples, some of these pinging operations might have indicated failure, such that the pass rate at column 712 might be varying and/or lower than 100% in certain scenarios. Graphical user interface 700 also further illustrates how the test type, as indicated by column 704, may correspond to a more particular "GtpPing" type of the ping operation, which can be based on the GPRS Tunneling Protocol (GTP), as distinct from a more generalized or generic pinging operation, as discussed above in connection with FIGS. 5-7.

The example of graphical user interface 700 in FIG. 7 illustrates how method 100 may proceed, in various embodiments, through the performance of various cycles and sub-cycles. At a highest level of a corresponding hierarchy, pinging operations may cycle through the cellular interface links associated with a cellular network, such as a 5G cellular network. Various examples of these cellular reference links are shown and described above in connection with diagram 200 in FIG. 2. For example, at a highest level of the hierarchy, method 100 may cycle through two or more of the cellular reference links, or any permutation of the cellular reference links, shown in diagram 200. As one illustrative example, method 100 may cycle through the cellular reference links by beginning with one cellular reference link type, such as the N6 interface (graphical user interface 500), then proceeding to another cellular reference link type, such as the N4 interface (graphical user interface 600), then proceeding to another cellular reference link type, such as the S8-U interface (graphical user interface 700), and so on, until the corresponding set or subset of cellular reference links has been exhausted. At each iteration of cycling through the cellular reference links, method 100 may also further proceed to perform a sub-cycle that cycles through each geographic hub corresponding to that cellular reference link within the database of method 100. Accordingly, at the iteration of the higher-level cycle for the N6 interface corresponding to graphical user interface 500, method 100 may further proceed to perform a sub-cycle through each geographic hub listed within the portion of the database for that particular cellular reference link, which further corresponds to rows 512-546 of graphical user interface 500. Similarly, after completing this performance of the sub-cycle through each of the geographic hubs for a corresponding cellular reference link type, the higher-level cycle may proceed to the next cellular reference link type, such as the N4 interface for graphical user interface 600, at which point method 100 may further perform another sub-cycle through each of the geographic hubs listed within the database for the corresponding cellular reference link type (i.e., in this case all of the geographic hubs shown within graphical user interface 600 and assigned to the N4 interface type). Lastly, method 100 may also further perform an additional sub-sub-cycle, at each iteration of a sub-cycle for each geographic hub, by iterating through the performance of multiple different pinging operations between the same source target Internet protocol address and the same target Internet protocol address. Thus, in the example of graphical user interface 700, as described above in connection with FIG. 7, at each iteration from one geographic hub to the next, method 100 may further perform an additional sub-sub-cycle that iterates between different performances of respective pinging operations between the same source Internet protocol address and the same target Internet protocol address, thereby providing a measurement of redundancy and corresponding assurance regarding the results of the pinging operations (e.g., a malfunction in the performance of one pinging operation can be remediated by the performance of three other non-malfunctioning pinging operations).

As described above, in various embodiments method 100 may include the performance of cycles, sub-cycles, and sub-sub-cycles, which cycle between reference link types (e.g., N3, N4, N5, etc.), geographic hubs (e.g., Denver, Las Vegas, Portland), and pinging operations (first ping between Denver and a target IP, second ping between Denver and the same target IP, etc.). Thus, with respect to cellular reference link types, method 100 may repeat the cycling through the database, within the portion of the database for the specific cellular reference link type, for each type of cellular reference link type in a set of multiple distinct cellular reference link types. Accordingly, the pinging operations performed for one cellular reference link type, such as N6 (FIG. 5), can be effectively repeated in a parallel manner, for another reference link type, such as N4 (FIG. 6), and so on, until completing or exhausting a set or subset of cellular reference link types, including any suitable permutation of the cellular reference link types shown in diagram 200. This set might include substantially every distinct cellular reference link type for 5G cellular networks (i.e., 80% or more of those shown in FIG. 2), or might include any two or more of the cellular reference link types N1-N15 (see FIG. 2).

Although the example above described a particular hierarchy for performing the pinging operations of method 100, the performance of method 100 does not necessarily need to follow this hierarchy or be performed in this particular order. In other examples, the highest level of the hierarchy may correspond to geographic hubs rather than reference link types. In various embodiments, what can be more important is that the total territory of desired pinging operations is covered or actually performed, regardless of the order in which the pinging operations are performed. Similarly, although the various cycles and sub-cycles can be performed in sequence, as discussed above in connection with FIGS. 5-7, in other examples some or all of these pinging operations can be performed in parallel because, as further discussed above, one goal of various embodiments is to ensure that the totality of desired pinging operations are performed, and corresponding results are reported, rather than the particular order in which these pinging operations are carried out. The steps of method 100 can be interpreted broadly to cover these alternative hierarchies and/or parallel pinging operations.

FIGS. 6-7 also refer to "all UPFd's" in their headlines. The reference to "all" instances of a cellular network node type, such as UPF or any other node type shown in diagram 200, refer to all or substantially all of a wide area network from a corresponding carrier or enterprise for the provisioning of cellular services, such as a nationwide 4G or 5G cellular network provided by a cellular service provider. Accordingly, when cycling between different cellular reference links types (e.g., cycling from N1 to N2 to N3, etc.), method 100 may further perform a sub-cycle, at each iteration of the cycle between cellular reference links, that iterates between geographic hubs for that corresponding cellular reference link and/or corresponding cellular network node, such as UPFd's. In this manner, method 100 may effectively cycle through, or check, every or substantially every (e.g., 90% or more) of the cellular reference links connected to UPFd's or other cellular network nodes that a cellular service provider leverages in the provisioning of a large, wide area, or nationwide cellular service network. The automation reflected in the cycles and/or sub-cycles of various embodiments of method 100 may enable a cellular service provider to check the health of its cellular reference links (e.g., all or substantially all such reference links and/or corresponding server nodes) in a more convenient, streamlined, efficient, and/or speedy manner. For example, the execution of a corresponding automation script or application may, in various embodiments of method 100, check substantially all of a carrier's 5G cellular reference links or interfaces on the order of minutes.

Figure 8:
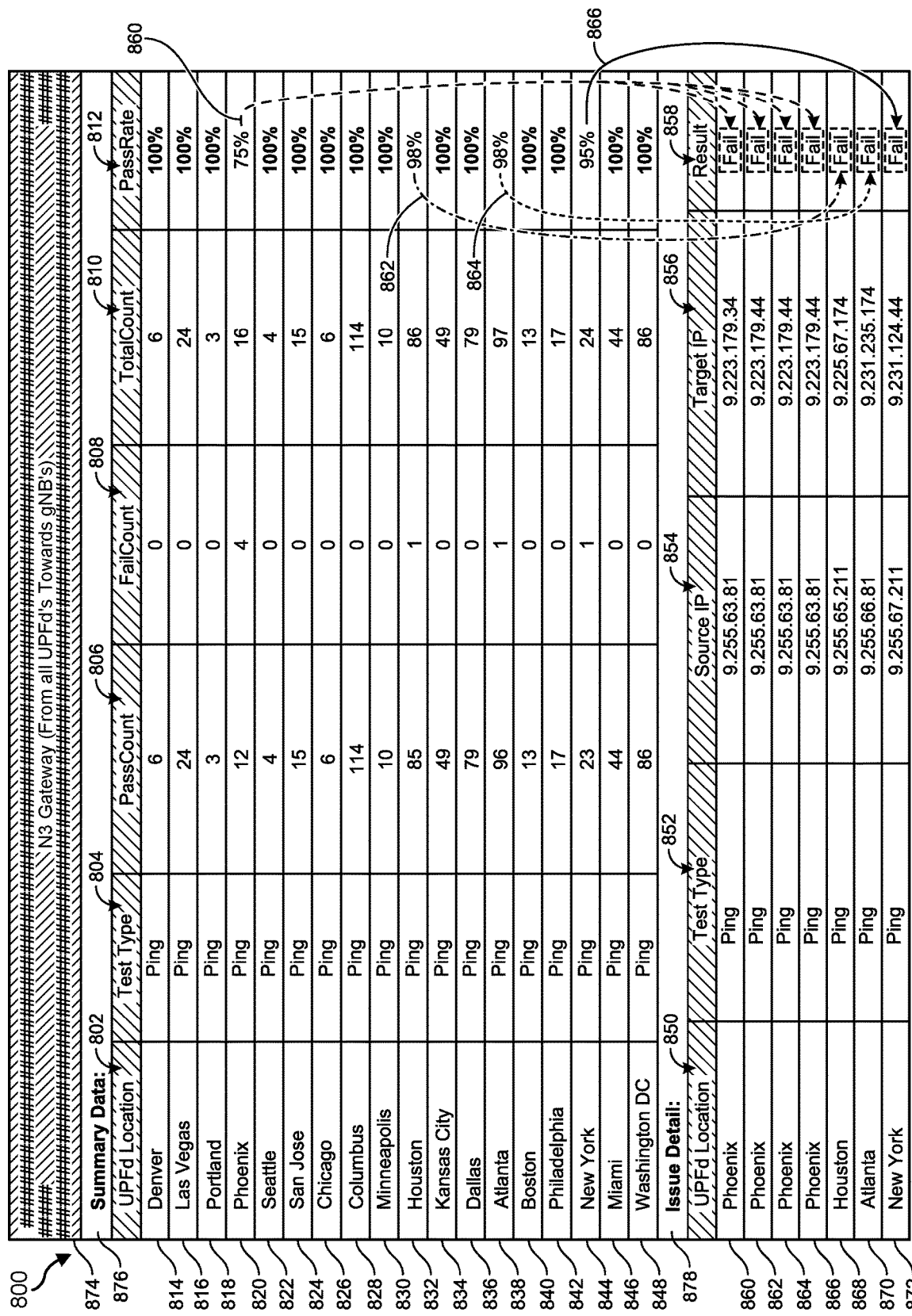
FIG. 8 shows a graphical user interface for the N3 reference link type that lists user plane function nodes and corresponding geographic hubs. This graphical user interface also shows additional information regarding pinging operations that indicated failure.

FIG. 8 shows another example graphical user interface 800 that further includes a headline 874 and a header section 876, as well as columns 802-812 and 850-858, as well as rows 814-872. Graphical user interface 800 substantially parallels graphical user interfaces 500, 600, and 700, except that graphical user interface 800 corresponds to the N3 interface or gateway, which can provide an interface between a user plane function node and gNBs within a 5G cellular network. Graphical user interface 800 differs from graphical user interface 700 due to the fact that the pass rate, as indicated at column 812, is not 100% for each row from among rows 814-848. In particular, graphical user interface 800 further illustrates how method 100 may further include dynamically displaying a source Internet Protocol address or a target Internet Protocol address for each ping operation that indicated failure. In the particular example of this figure, at row 820, among 16 total pinging operations, only 12 (see column 806) of those pinging operations indicated success, resulting in a pass rate of 75% (see cell 860). The details of the four pinging operations that indicated failure are further reported at rows 860-866 across a column 852 indicating a test type, a column 854 indicating a source Internet protocol address, and a column 856 indicating a target Internet protocol address, as well as a column 858 indicating results of the corresponding pinging operation (i.e., fail). Similarly, the details of the pinging operation indicating failure and corresponding to row 832, at cell 862, are further reported at row 868, the details of the pinging operation indicating failure and corresponding to row 838, at cell 864, are further reported at row 870, and the details of the pinging operation indicating failure and corresponding to row 844 at cell 866 are further reported at row 872. In this manner, graphical user interface 800 may further report, in a dynamic way, additional details regarding the pinging operations that indicated failure, which might be the more important or relevant results for an administrator to attend to.

In contrast, method 100 may also additionally, or alternatively, include dynamically omitting, from a display, a source Internet Protocol address or a target Internet Protocol address for each ping operation that indicated success. Thus, in the example of FIG. 8 for illustrative purposes, the more detailed information shown for pinging results that indicated failure (see rows 860-872) are dynamically omitted for pinging operations that indicating success (see rows 814-818, by way of example). In this manner, method 100 can be performed such that detailed results are elevated in priority, or prominence, when displayed to the administrator for results that are more relevant or time sensitive, in contrast to other results that might merely indicate an expected successful pinging operation.

For completeness, FIG. 9 also further shows another graphical user interface 900 that substantially parallels graphical user interfaces 500, 600, 700, and 800, except that graphical user interface 900 corresponds to the N6 Left/Right Service Chain interface. Graphical user interface 900 may further include a headline 952, a header section 954, columns 902-912, and rows 914-950. Graphical user interface 900 may also further differ from previous graphical user interfaces that are discussed above due to the fact that row 950 within graphical user interface 900 further specifies an overall pass rate (i.e., 99.432% in row 950) for a total set of health check tests or pinging operations (i.e., a total number of 1,234 pinging operations as indicated at 950). Because each pinging operation or health check test can occupy a particular position within a bitmap, where a one or zero at that position indicates success or failure, a checksum operation can be calculated on the value formed by this bitmap, and row 950 further specifies an example of such a checksum (i.e., 4180627127 in this example). The use of a checksum or other data integrity function result can be leveraged to quickly detect changes in results when performing massive numbers of pinging operations, and can also further facilitate the zeroing in, or drilling down on, any indications of failure or diminishing performance, while placing less emphasis on expected successful pinging operations, similar to the dynamic display functionality discussed above regarding graphical user interface 700. In other words, an inconspicuous change in even a single bit in a massive bitmap can be easily detected when the corresponding checksum value changes, in a conspicuous manner, thereby rendering an inconspicuous change to be more conspicuous, which can facilitate review by the administrator and highlight issues that are higher priority while demoting expected successful pinging operations.

Figure 10:
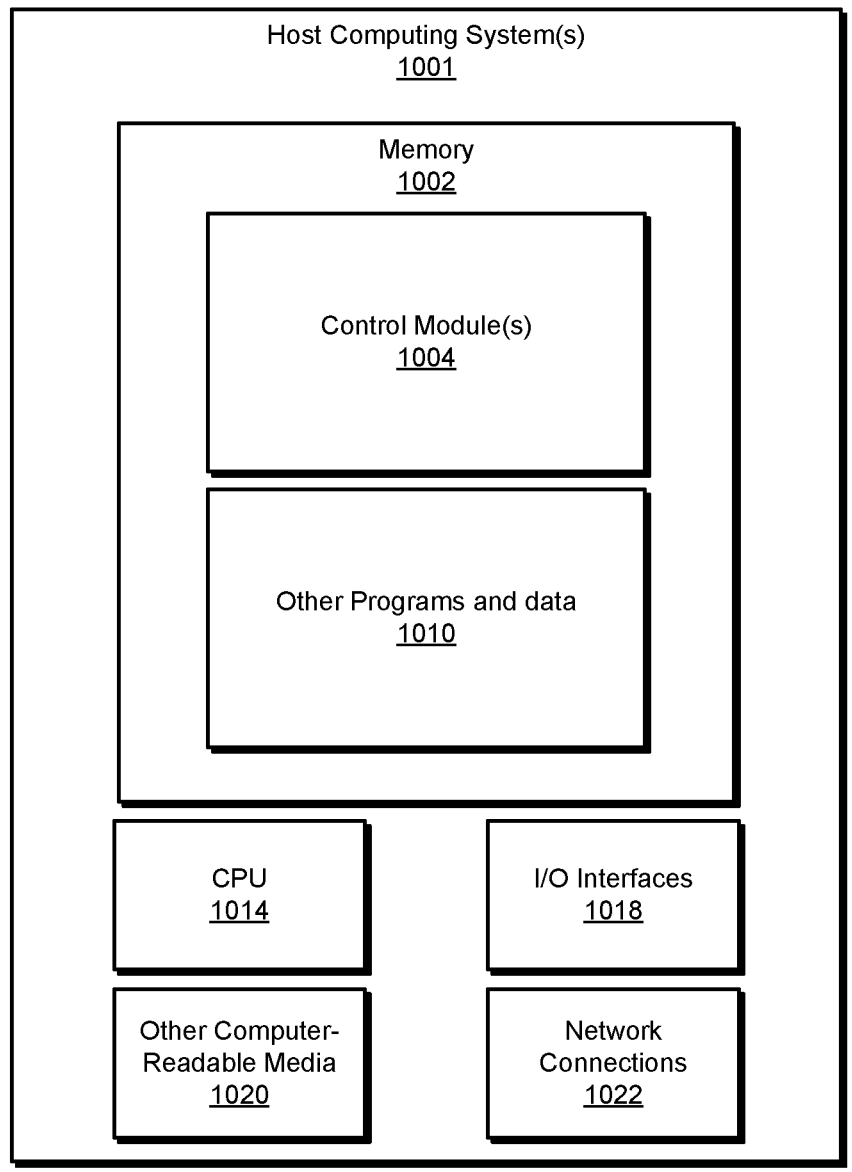
FIG. 10 shows an example computer system that may facilitate the performance of one or more of the methods described herein.

FIG. 10 shows a system diagram that describes an example implementation of a computer system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 10 illustrates an example of underlying hardware on which such software and functionality may be hosted and/or implemented.

In particular, shown is example host computer system(s) 1001. For example, such host computer system(s) 1001 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1001 may include memory 1002, one or more central processing units (CPUs) 1014, I/O interfaces 1018, other computer-readable media 1020, and network connections 1022.

Memory 1002 may include one or more various types of non-volatile and/or volatile storage technologies. Examples of memory 1002 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1002 may be utilized to store information, including computer-readable instructions that are utilized by CPU 1014 to perform actions, including those of embodiments described herein.

Memory 1002 may have stored thereon control module(s) 1004. The control module(s) 1004 may be configured to implement and/or perform some or all of the functions of the systems or components described herein. Memory 1002 may also store other programs and data 1010, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, cloud native functions (NF), artificial intelligence (AI) or machine learning (ML) programs or models to perform the functionality described herein, user interfaces, operating systems, other network management functions, other NFs, etc.

Network connections 1022 are configured to communicate with other computing devices to facilitate the functionality described herein. In various embodiments, the network connections 1022 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1018 may include a video interface, other data input or output interfaces, or the like. Other computer-readable media 1020 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method comprising:
 maintaining a database that maps cellular reference link types to geographic hubs that include a respective cellular network node connected through a respective cellular reference link type;

cycling through the database, within a portion of the database for a specific cellular reference link type, to perform a ping operation from each respective geographic hub mapped to the specific cellular reference link type; and displaying, through a graphical user interface, results to an administrator indicating which ping operations from the cycling through the database indicated failure such that the administrator is enabled to perform a remediation operation.

2. The method of claim 1, further comprising repeating the cycling through the database, within the portion of the database for the specific cellular reference link type, for each type of cellular reference link type in a set of multiple distinct cellular reference link types.

3. The method of claim 1, further comprising repeating the cycling through the database, within the portion of the database for the specific cellular reference link type, for each type of cellular reference link type in a set of substantially every distinct cellular reference link type for 5G cellular networks.

4. The method of claim 2, wherein the set of multiple distinct cellular reference link types comprises at least three of N1-N15.

5. The method of claim 1, wherein each respective cellular network node includes a different one from a set of a user equipment, a radio access network, a user plane function, a data network, an access and mobility management function, a session management function, a policy control function, an application function, a unified data management node, or an authentication server function.

6. The method of claim 1, wherein the cellular reference link types correspond to a 5G cellular network.

7. The method of claim 1, wherein displaying, through the graphical user interface, results to the administrator indicating which ping operations from the cycling through the database indicated failure such that the administrator is enabled to perform the remediation operation comprises dynamically displaying a source Internet Protocol address or a target Internet Protocol address for each ping operation that indicated failure.

8. The method of claim 1, wherein displaying, through the graphical user interface, results to the administrator indicating which ping operations from the cycling through the database indicated failure such that the administrator is enabled to perform the remediation operation comprises dynamically omitting a source Internet Protocol address or a target Internet Protocol address for each ping operation that indicated success.

9. The method of claim 1, wherein displaying, through the graphical user interface, results to the administrator indicating which ping operations from the cycling through the database indicated failure such that the administrator is enabled to perform the remediation operation comprises displaying, for each geographic hub among the geographic hubs, a pass count of ping operations, a fail count of ping operations, a total count of ping operations, or a pass rate of ping operations.

10. The method of claim 1, wherein cycling through the database, within the portion of the database for the specific cellular reference link type, to perform a ping operation from each respective geographic mapped to the specific cellular reference link type, comprises performing multiple ping operations from each respective cellular network node.

11. A system comprising:

at least one physical processor; and a non-transitory computer-readable medium encoding instructions that, when executed by the at least one physical processor, cause operations to be performed comprising:

maintaining a database that maps cellular reference link types to geographic hubs that include a respective cellular network node connected through a respective cellular reference link type;

cycling through the database, within a portion of the database for a specific cellular reference link type, to perform a ping operation from each respective geographic hub mapped to the specific cellular reference link type; and displaying, through a graphical user interface, results to an administrator indicating which ping operations from the cycling through the database indicated a failure such that the administrator is enabled to perform a remediation operation.

12. The system of claim 11, wherein the operations further comprise repeating the cycling through the database, within the portion of the database for the specific cellular reference link type, for each type of cellular reference link type in a set of multiple distinct cellular reference link types.

13. The system of claim 11, wherein the operations further comprise repeating the cycling through the database, within the portion of the database for the specific cellular reference link type, for each type of cellular reference link type in a set of substantially every distinct cellular reference link type for 5G cellular networks.

14. The system of claim 12, wherein the set of multiple distinct cellular reference link types comprises at least three of N1-N15.

15. The system of claim 11, wherein each respective cellular network node includes a different one from a set of a user equipment, a radio access network, a user plane function, a data network, an access and mobility management function, a session management function, a policy control function, an application function, a unified data management node, or an authentication server function.

16. The system of claim 11, wherein the cellular reference link types operate within a 5G cellular network.

17. The system of claim 11, wherein displaying, through the graphical user interface, results to the administrator indicating which ping operations from the cycling through the database indicated failure such that the administrator is enabled to perform the remediation operation comprises dynamically displaying a source Internet Protocol address or a target Internet Protocol address for each ping operation that indicated failure.

18. The system of claim 11, wherein displaying, through the graphical user interface, results to the administrator indicating which ping operations from the cycling through the database indicated failure such that the administrator is enabled to perform the remediation operation comprises dynamically omitting a source Internet Protocol address or a target Internet Protocol address for each ping operation that indicated success.

19. The system of claim 11, wherein displaying, through the graphical user interface, results to the administrator indicating which ping operations from the cycling through the database indicated failure such that the administrator is enabled to perform the remediation operation comprises displaying, for each geographic hub among the geographic hubs, a pass count of ping operations, a fail count of ping operations, a total count of ping operations, or a pass rate of ping operations.

20. A non-transitory computer-readable medium encoding instructions that, when executed by at least one physical processor of a computing device, cause the computing device to perform operations comprising:
  maintaining a database that maps cellular reference link types to geographic hubs that include a respective cellular network node connected through a respective cellular reference link type;
  cycling through the database, within a portion of the database for a specific cellular reference link type, to perform a ping operation from each respective geographic hub mapped to the specific cellular reference link type; and
  displaying, through a graphical user interface, results to an administrator indicating which ping operations from the cycling through the database indicated a failure such that the administrator is enabled to perform a remediation operation.

* * * * *